US012568066B2

(12) United States Patent
Dantakale et al.

(10) Patent No.: US 12,568,066 B2
(45) Date of Patent: Mar. 3, 2026

(54) APPLICATION ASSURANCE SYSTEM HAVING A METHOD OF OFFLOADING SERVICE FROM AN EDGE DEVICE TO THE CLOUD

(71) Applicant: Hewlett Packard Enterprise Development LP, Spring, TX (US)

(72) Inventors: Mahesh M. Dantakale, Bangalore (IN); Akhil R. Kothakota, Washington, DC (US); Hardik Sanghavi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 396 days.

(21) Appl. No.: 18/194,588

(22) Filed: Mar. 31, 2023

(65) Prior Publication Data

US 2024/0333684 A1     Oct. 3, 2024

(51) Int. Cl.
*H04L 9/40*       (2022.01)

(52) U.S. Cl.
CPC .......... *H04L 63/0263* (2013.01); *H04L 63/20* (2013.01)

(58) Field of Classification Search
CPC ............................ H04L 63/0263; H04L 63/20
USPC ........................................................ 726/11
See application file for complete search history.

(56) References Cited

U.S. PATENT DOCUMENTS

| | | | | |
|---|---|---|---|---|
| 8,578,443 | B2 * | 11/2013 | Narain | .................. G06F 21/629 |
| | | | | 726/1 |
| 2012/0311659 | A1 * | 12/2012 | Narain | .................. H04W 12/37 |
| | | | | 726/1 |
| 2016/0119285 | A1 * | 4/2016 | Kakhandiki | ............ H04L 67/34 |
| | | | | 726/1 |

(Continued)

FOREIGN PATENT DOCUMENTS

EP       3188440 A1     7/2017

OTHER PUBLICATIONS

Juniper Networks, "Predefined Application Signatures for Application Identification", available online at <https://www.juniper.net/documentation/us/en/software/junos/application-identification/topics/topic-map/security-application>, Apr. 2021, 39 pages.

(Continued)

*Primary Examiner* — Aubrey H Wyszynski

(74) *Attorney, Agent, or Firm* — Hewlett Packard Enterprise Patent Department

(57) ABSTRACT

A cloud-based application assurance service system and method using Deep Packet Inspection (DPI) enables Network Elements (NE) to access the cloud-based application assurance service to search a rules/signature database, without impacting latency on network-firewall decisions. Additionally, the application assurance service system distributes the associated mapping of the NE cache's latest contents to neighboring NEs, where a given user might next access the network. The system can recognize applications associated with network traffic and apply firewall rules. Further, the system tracks applications and uses this data to update NE (Continued)

caches periodically, such that NE caches are more likely to store the relevant application signatures in advance. Moreover, a historical user usage matrix is generated to track application use per user, which is used to detect a highly probable user path and transfer mapping to an associated NE.

20 Claims, 6 Drawing Sheets

(56) References Cited

U.S. PATENT DOCUMENTS

2019/0281077 A1* 9/2019 Deb .................... H04L 63/1425

OTHER PUBLICATIONS

Mereki, "Layer 7 Visibility and Control", White Paper, Feb. 2013, 11 pages.
Mun et al., "Internet Traffic Classification with Federated Learning", MDPI, 2021, 18 Pages.

* cited by examiner

Figure 3:
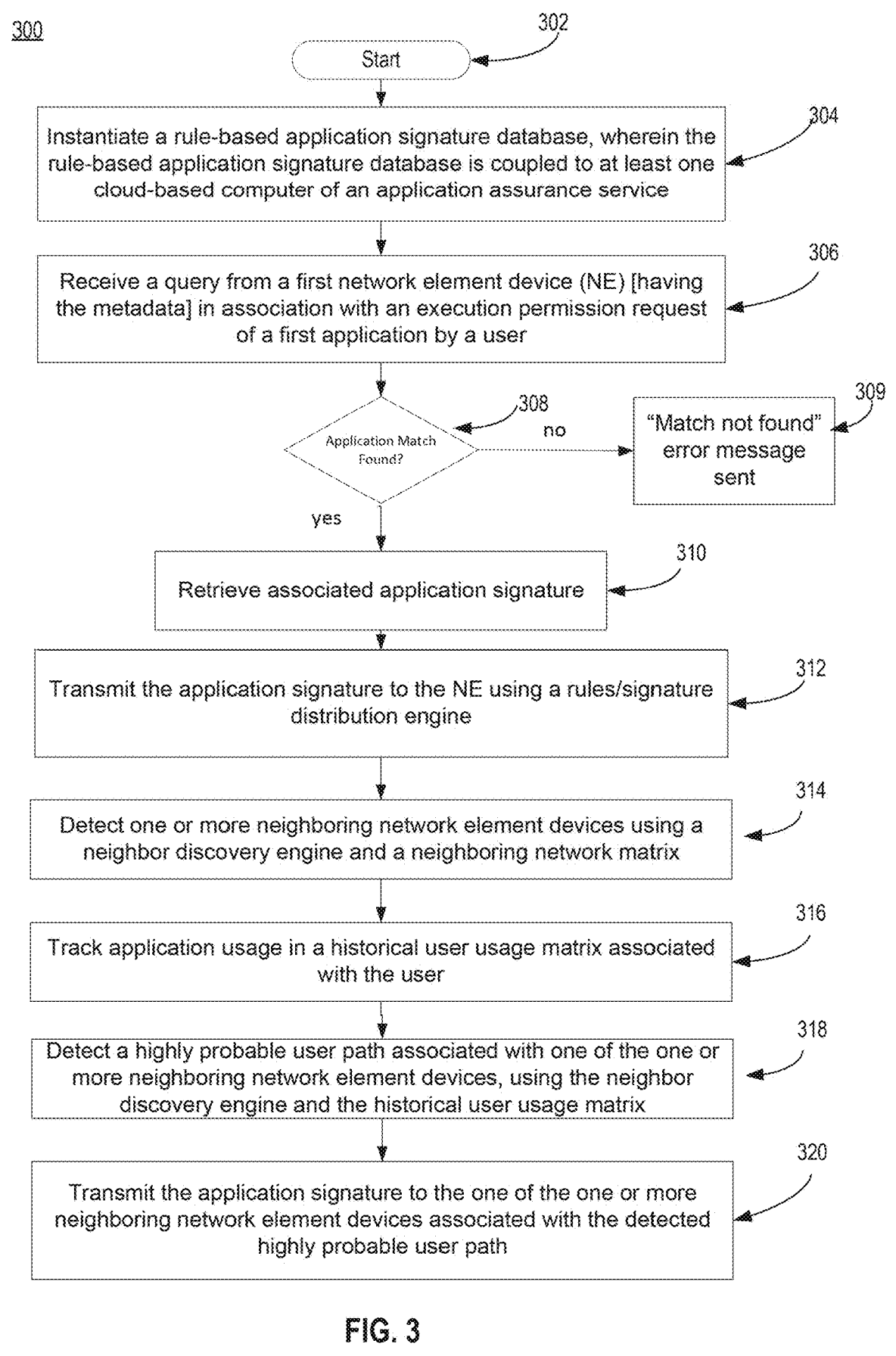

300

302

Start

Instantiate a rule-based application signature database, wherein the rule-based application signature database is coupled to at least one cloud-based computer of an application assurance service

304

Receive a query from a first network element device (NE) [having the metadata] in association with an execution permission request of a first application by a user

306

308

Application Match Found?

no

"Match not found" error message sent

309 yes

Retrieve associated application signature

310

Transmit the application signature to the NE using a rules/signature distribution engine

312

Detect one or more neighboring network element devices using a neighbor discovery engine and a neighboring network matrix

314

Track application usage in a historical user usage matrix associated with the user

316

Detect a highly probable user path associated with one of the one or more neighboring network element devices, using the neighbor discovery engine and the historical user usage matrix

318

Transmit the application signature to the one of the one or more neighboring network element devices associated with the detected highly probable user path

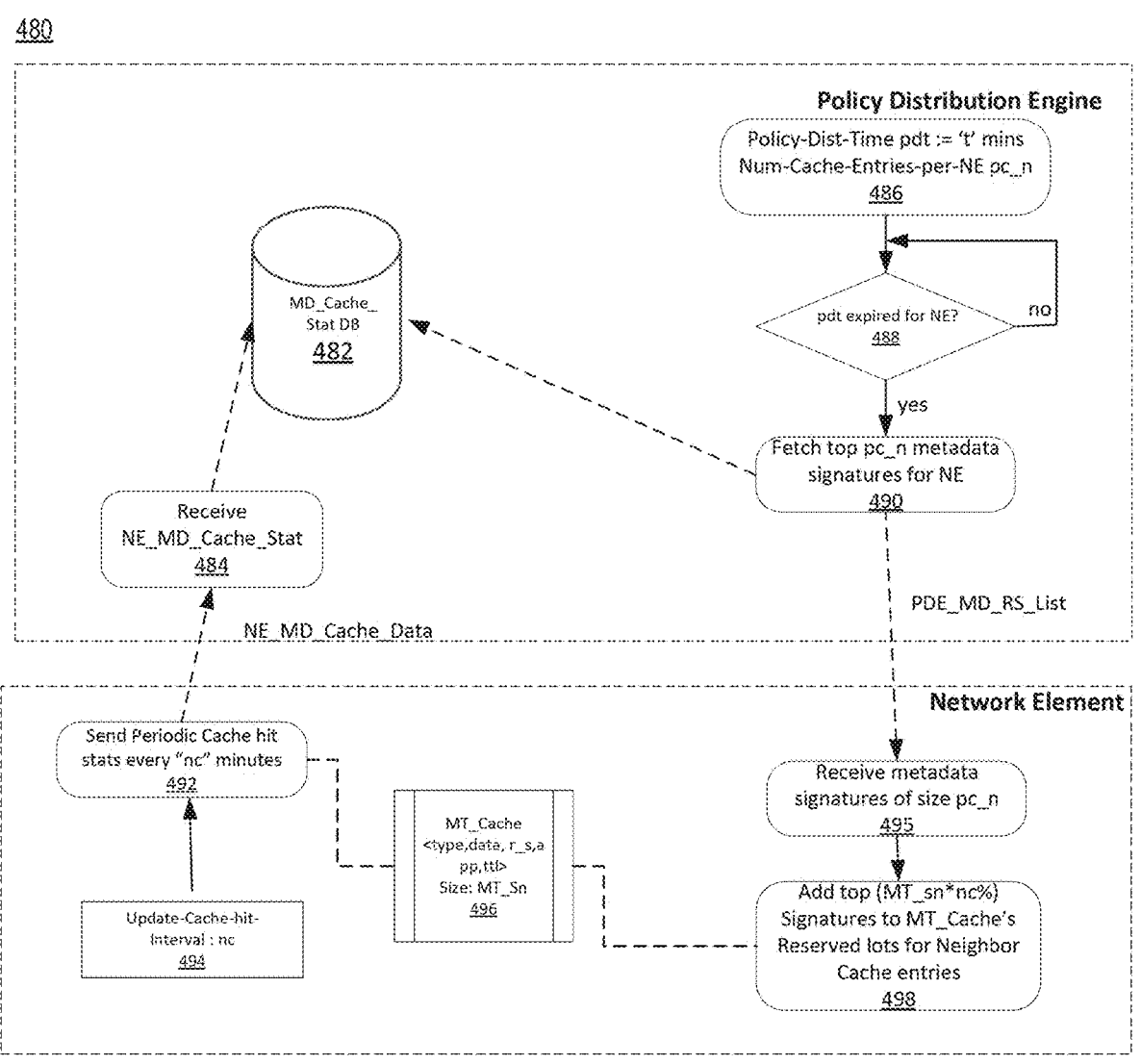

Policy Distribution Engine

Policy-Dist-Time pdt := 't' mins
Num-Cache-Entries-per-NE pc_n
486 pdt expired for NE?          no
488 yes

Fetch top pc_n metadata
signatures for NE
490

MD_Cache_
Stat DB
482

Receive
NE_MD_Cache_Stat
484

PDE_MD_RS_List

NE_MD_Cache_Data

Network Element

Send Periodic Cache hit
stats every "nc" minutes
492

Update-Cache-hit-
Interval : nc
494

MT_Cache
<type,data, r_s,a
pp,ttl>
Size: MT_Sn
496

Receive metadata
signatures of size pc_n
495

Add top (MT_sn*nc%)
Signatures to MT_Cache's
Reserved lots for Neighbor
Cache entries
498

FIG. 4B

APPLICATION ASSURANCE SYSTEM HAVING A METHOD OF OFFLOADING SERVICE FROM AN EDGE DEVICE TO THE CLOUD

CROSS REFERENCE TO RELATED APPLICATIONS

This application relates to commonly owned U.S. patent application Ser. No. 17/387,003, entitled "APPLICATION CLASSIFICATION DISTRIBUTION TO NETWORK DEVICES," filed Jul. 28, 2021, which is currently a co-pending application; the content of which is incorporated by herein by reference in its entirety.

BACKGROUND

Modern Network Intelligence (MNI) is a technology that blends concepts like Deep Packet Inspection (DPI), Packet Capture, and Business Intelligence, providing an analysis of data and communication patterns. Specifically, a computer network implementing DPI inspects data packets as they are being sent over a computer network, and may take actions such as alerting, blocking, re-routing, or logging the same. DPI is often used to baseline application behavior; to analyze network usage; to troubleshoot network performance; to ensure data format (correction); and to scan for malicious code, eavesdropping, and internet censorship. More particularly within a computer network, Network Elements (NEs) that unite one or more physical devices use packet data all the way up to the application layer to perform these functions.

Accordingly, MNI represents the culmination of examining packets that cross the NE and extracting metadata therefrom to perform DPI. This metadata can be fed into one or more remote or local applications that perform bandwidth control, traffic shaping, lawful interception, and application blocking (through an application assurance service). Particularly, an application assurance service can use DPI to assist in recognizing an underlying application, category, web-reputation, and protocol. This information gathered using DPI is further used in a network to apply firewall rules. Ultimately, application assurance seeks to provide a secure customer experience regardless of user location and regardless of possibly hundreds of different broadband connections across an enterprise.

BRIEF DESCRIPTION OF THE DRAWINGS

Various objects, features, aspects and advantages of the inventive subject matter will become more apparent from the following specification, along with the accompanying drawings in which like numerals represent like components.

FIG. 3 shows a flow diagram of a method for providing the application assurance service by the application assurance system of FIG. 2, in accordance with some examples.

FIG. 4B illustrates a flow diagram of a method for redistribution of signatures from the policy distribution engine to network elements of FIG. 2, in accordance with some examples.

Figure 1:
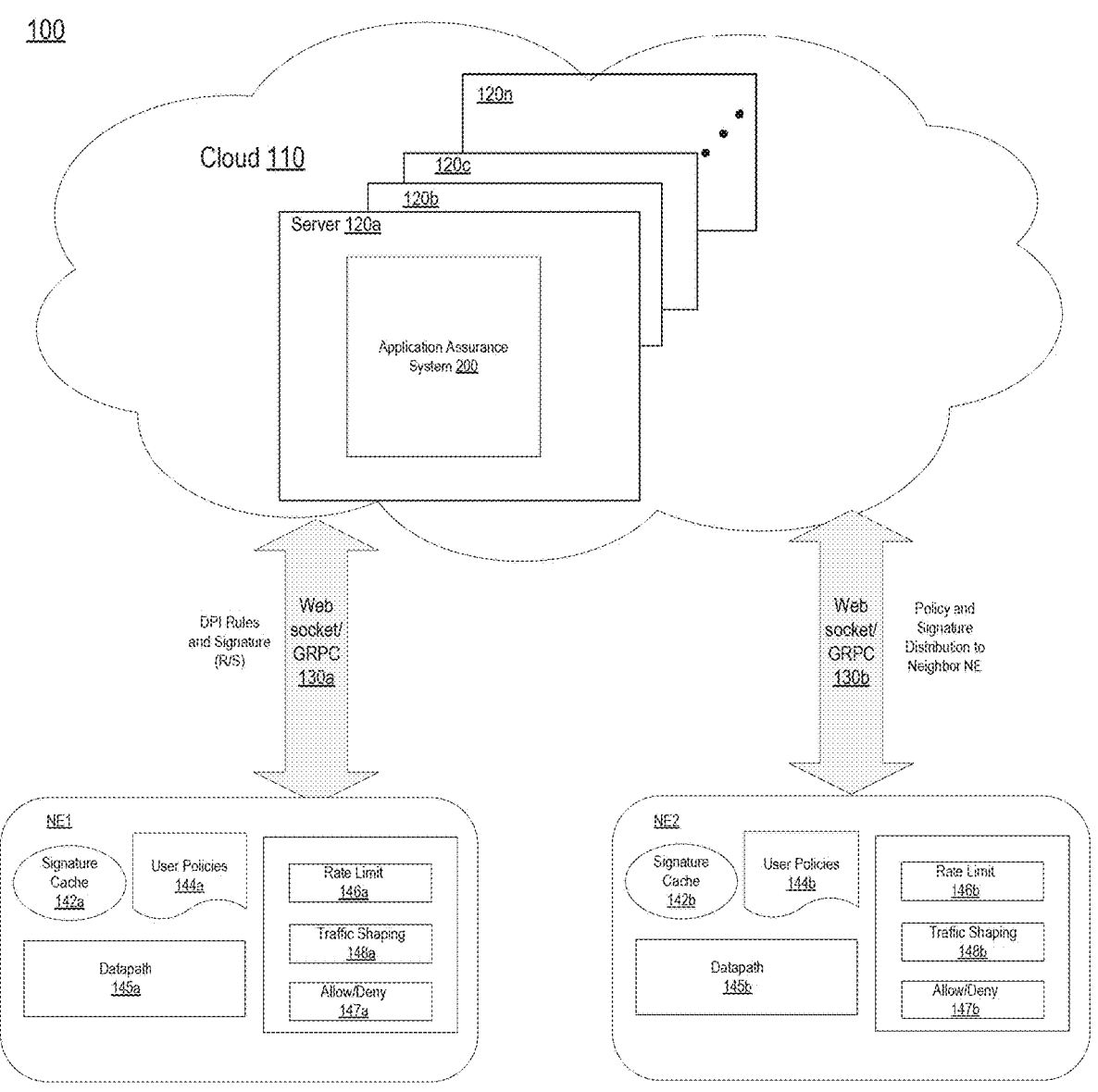
FIG. 1 illustrates a system diagram of a cloud-based application assurance system for recognizing applications associated with network traffic and applying firewall rules, in accordance with some examples.

While the examples are described with reference to the above drawings, the drawings are intended to be illustrative, and various other examples are consistent with the spirit, and within the scope, of this disclosure.

DETAILED DESCRIPTION

An application assurance service using Deep Packet Inspection (DPI) allows Network Elements (NE), including, for example, Wi-Fi access points, gateways, and controllers, to recognize applications associated with network traffic and apply firewall rules. Edge networking is a distributed computing paradigm that brings computation and data storage as close to the point of request as possible in order to deliver low latency and save bandwidth. As such, an edge NE is typically used to perform application assurance locally. This approach, however, has several drawbacks because edge NEs are typically resource-constrained devices with limited memory and processing bandwidth. A large number of pattern-matching rules and signatures may not be supported, and the number of application signatures and rules that can be stored and processed may be drastically limited. Further, application assurance intelligence learned on one NE device is typically isolated to that device, with neighboring NE devices remaining blind to the information. Although application signatures and rules can be shared among edge devices, the time required to update several edge devices increases the likelihood of causing network downtime and/or other suboptimal scenarios. Moreover, current systems often require network administrators to manually regulate rules and signatures periodically. Furthermore, when signatures are updated, most if not all of the NEs should be upgraded, which again increases the risk of network downtime. When considering current systems, even if the DPI service is moved to the cloud, the resulting latency would increase the risk of failure in uniformly applying application assurance/firewall policies on edge NEs.

An innovative cloud-based application assurance service system and method using Deep Packet Inspection (DPI) disclosed herein enables NEs to access the cloud-based application assurance module to search a rules/signature database, without impacting latency on network-firewall decisions. The system can recognize applications associated with network traffic and apply firewall rules. The system can also track applications and use this data to update NE caches periodically, such that NE caches are more likely to store relevant application signatures associated with each user in advance. The application assurance module disclosed herein distributes the associated mapping of an NE cache's latest contents to neighboring NEs, where there is a high probability that a given user might next access the network. The application assurance module tracks application use per user and generates a historical user usage matrix for storage of the tracking associated with each user, wherein the historical user usage matrix is used to detect a highly probable user path and transfer the application mapping to an NE associated with the highly probable user path.

To be able to perform the aforementioned features, the application assurance service system disclosed herein stores and manages application signatures and distribution policies in cloud servers. These cloud servers are used to update caches of an NE and neighboring NEs. In an example application assurance service system, each NE uses its own local NE cache of application signatures before querying the cloud-based application assurance module. When an application signature match is not found locally, the NE requests an application signature associated with captured metadata from its network traffic. At the cloud-based application assurance module, the received NE request is used to query a rule/signature database for an associated signature and mapping. The application assurance module tracks the user's application usage and uses machine learning and other probabilistic techniques to determine the highly probable user path. The associated application signature and mapping is sent not only to the requesting NE, but also to the neighboring NEs and the NEs in the highly probable user path.

The following examples describe a system, method, and device for implementing a cloud-based application assurance system for recognizing applications associated with network traffic and applying firewall rules, having limited impact on latency of network-firewall decisions. It can be appreciated by one skilled in the art, that the examples may be practiced without some or all of these specific details. In other instances, well known process operations have not been described in detail in order not to unnecessarily obscure the examples.

In one example, the cloud-based application assurance system includes a server coupled to at least one network element (NE), the server having at least one processor coupled to at least one memory. Additionally, the application assurance system includes an application assurance module having a DPI service unit, a rule/signature distribution engine, a neighbor discovery engine, and a policy distribution engine, wherein the DPI module is coupled to the at least one NE. DPI module couples to receive a query from a first NE in association with an execution permission request of a first application by a user. In response, the DPI module, in cooperation with the R/S distribution engine, verifies application compliance of the first application using a rule-based application signature database. When a match is determined, the DPI module returns an application signature associated with the first application to the requesting NE. The neighbor discovery engine couples to the DPI service unit to detect one or more neighboring network element devices. Further, the neighbor discovery engine tracks application usage in a historical user usage matrix associated with the user. Based upon the historical user usage matrix, the neighbor discovery engine detects a highly probable user path associated with one of the one or more neighboring network element devices using a predictive algorithm. The policy distribution engine couples to the DPI service unit to transmit, in response to the application compliance verification within the rule-based application database, the application signature to the one of the one or more neighboring network element devices associated with the detected highly probable user path.

In some examples, the application assurance method of the cloud-based application assurance system described herein includes instantiating a rule-based application signature database, wherein the rule-based application signature database is coupled to at least one cloud-based computer having an application assurance service, such as for example a DPI service unit. The method includes receiving a query from a first network element device (NE) in association with an execution permission request of a first application by a user. In some examples, the receiving of a query by the cloud-based computer occurs after a local query performed on the first NE. Further, the method of application assurance described herein includes verifying application compliance of the first application using the rule-based application database on the cloud-based computer. Based upon the application compliance verification within the rule-based application database, the method includes retrieving an application signature. In response to receipt of the application signature, the method includes transmitting the application signature to the NE using a DPI service unit. Using a neighbor discovery engine, the method of application assurance includes detecting one or more neighboring network element devices. As an additional feature, the method of application assurance includes tracking application usage in a historical user usage matrix associated with the user. Using the neighbor discovery engine and the historical user usage matrix, the method of application assurance includes detecting a highly probable user path associated with one of the one or more neighboring network element devices. In response to an application compliance verification within the rule-based application database, the method of application assurance includes transmitting the application signature to the one of the one or more neighboring network element devices associated with the detected highly probable user path.

Advantageously, utilizing the cloud-based application assurance system described herein, resource heavy services like DPI, User-Policy-Engines, and Policy-Distribution can be migrated from the NE to the cloud. This cloud-based application assurance system overcomes latency issues associated with migrating these services to the cloud, by maintaining a cache of rules and signatures on the NE; wherein duplicate requests to the cloud are avoided and latency is minimized. That is, latency or delay occurs as a result of the first flow/session. As a further advantage, distributing rules and signatures to neighboring NEs will provide an advantage of populating the cache for a user, when the user roams from one NE to another. Further, this application assurance service is beneficial in that it maintains a history of policies and signatures per user in the cloud and pushes the same to NEs, when a user re-connects to the network. Most users are more likely to have the same policies assigned based on their role and may also access the same set of applications. Upgrading the DPI service unit would not affect the network downtime, as it needs to be upgraded on the cloud and not on each NE. This application assurance system makes switching these functions from one vendor-supplied feature to another seamless.

Referring to FIG. 1, an example of a system diagram of a cloud-based application assurance system for recognizing applications associated with network traffic and applying firewall rules is shown. System 100 includes at least one data center within cloud 110 having one or more servers 120a-n, with at least one application assurance module 200 coupled to one or more network elements (NE1, NE2), in accordance with some examples. In some example examples, one or more network elements (NE1, NE2) may couple to data center of cloud 110 as subscribers to its cloud computing resources. Each one of the one or more network elements (NE1, NE2) may include a signature cache (142a, 142b), user policies (144a, 144b), and one or more devices that monitor and/or detect data-path, rate limit, traffic, and execution permissions using units: data-path (145a, 145b), rate limit unit (146a, 146b), traffic unit (148a, 148b), and allow/deny unit (147a, 147b), respectively. Data traffic between each one of the network elements (NE1, NE2) and the data center of cloud 110 is facilitated over one or more buses 130*ab*, using the web socket Google remote protocol (gRPC).

In some examples, module 200, having the application assurance procedures and communication between the data center of cloud 110 and the one or more NEs (NE1, NE2), may serve as a device that performs all of the processing in accordance with the method of application assurance described herein. In other examples, each one of the one or more NEs (NE1, NE2) serves as the device that performs all of the data processing steps in accordance with the method of application assurance described herein. In other examples, both the one or more NES (NE1, NE2) and the application assurance module 200 both share in the application assurance method, where the cloud-based module 200 receives a query from a network element device (NE1, NE2) in association with an execution permission request of a first application by a user. In other examples, the receiving of a query by the cloud-based module 200 occurs after a local query performed on the network element device (NE1, NE2).

In various examples, the one or more network elements (NE1, NE2) may include Wi-Fi access points, gateways, controllers, service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Server nodes 120*a-n* may comprise a processor (not shown), memory (not shown), and application assurance module 200. In some embodiments, server nodes 120*a-n* may comprise processing software instructions and/or hardware logic required for application assurance service according to the examples described herein. Server nodes 120*a-n* may provide remote cloud storage capabilities for data-path, rate limit, traffic, execution permissions, and various types of security policies for the one or more associated one or more NEs (NE1, NE2) through buses 130*ab*. In addition, server nodes 120*a-n* may provide remote storage capabilities for a history of rules, rule-based policies, and signatures per user. Further, server nodes 120*a-n* may couple to one or more tape-out devices (not shown) or any other secondary datastore. As such, a database of user profile data and security policies may be stored within a local data store, remote disks, secondary data storage devices, or tape-outs devices (not shown). Although not shown, in various examples, server nodes 120*a-n* may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

In operation, during the initialization process, application assurance module 200, having the application assurance method of the cloud-based application assurance system described herein, instantiates a rule-based application signature database. Each one of the one or more network elements (NE1, NE2) monitor network traffic continuously for detecting applications and applying associated firewall rules. In some examples, the receiving of a query by the cloud-based application assurance computer occurs after a local query performed on the first network element NE1. For example, when network element NE1 discovers that a user has sent packets relating to the execution of a new application, network element NE1 searches its local cache for an application signature and rule. Network element NE1 will parse a packet to retrieve associated metadata and compare it to NE1's local rule/signature database. If a match is detected, rate limit unit 146*b*, the allow/deny unit 147*a* or traffic shaping unit 148*b* of network element NE1 grants the user permission to run respective operation on the application. In some examples beyond, allow/deny unit 147*a* grants not only execution, but also performs bandwidth control (ratelimit), traffic shaping, logging and various other administrative features. If no match is detected, network element NE1 sends a query request to the cloud-based application assurance module 200 through bus 130*a*; wherein the request includes the associated metadata. In response, application assurance module 200 verifies application compliance of the first application using the rule-based application database on the cloud-based server 120*a*. Specifically, application assurance module 200 searches its rule/signature database for an associated signature based upon the metadata. When it finds a match, module 200 retrieves and transfers the associated mapping and signature to the requesting network element NE. Further, application assurance module 200 detects one or more neighboring network element devices. Additionally, application assurance module 200 tracks each user's application usage in a historical user usage matrix associated with the user. Furthermore, application assurance module 200 detects a highly probable user path associated with one of the one or more neighboring network element devices (NE1, NE2). Thereby, the application assurance module 200 is able to transmit the application signature to one or more neighboring network element devices associated with this detected highly probable user path. For example, if network element NE2 is a neighboring network element to network element NE1, application assurance module 200 will transfer the application signature to network element NE2.

In some examples, the application assurance method of the cloud-based application assurance system described herein includes instantiating a rule-based application signature database, wherein the rule-based application signature database is coupled to at least one cloud-based computer having an application assurance service, such as for example a DPI service unit. The method includes receiving a query from a first network element device (NE) in association with an execution permission request of a first application by a user. In some examples, the receiving of a query by the cloud-based computer occurs after a local query performed on the first NE. Further, the method of application assurance described herein includes verifying application compliance of the first application using the rule-based application database on the cloud-based computer. Based upon the application compliance verification within the rule-based application database, the method includes retrieving an application signature. In response to receipt of the application signature, the method includes transmitting the associated application signature and mapping to the NE using a rules/signature distribution engine. Using a neighbor discovery engine, the method of application assurance includes detecting one or more neighboring network element devices. As an additional feature, the method of application assurance includes tracking application usage in a historical user usage matrix associated with the user. Using the neighbor discovery engine and the historical user usage matrix, the method of application assurance includes detecting a highly probable user path associated with one of the one or more neighboring network element devices. In response to an application compliance verification within the rule-based application compliance verification within the rule-based application compliance database, the method of application assurance includes transmitting the associated application signature and mapping to the one of the one or more neighboring network element devices associated with the detected highly probable user path.

It is appreciated that the components of operating environment of system 100 are examples; wherein more or fewer components may be present in various configurations. It is appreciated that operating environment may be part of a distributed computing environment, a cloud computing environment, a client server environment, and the like. In other words, as would be apparent to one of ordinary skill in the art after reading this description, the various features and functionality described herein may be implemented in the application assurance service architecture using any arrangement components necessary to perform the application recognition and fire-wall decision features (and functionality); and can be implemented in one or more separate or shared modules in various combinations and permutations.

Figure 2:
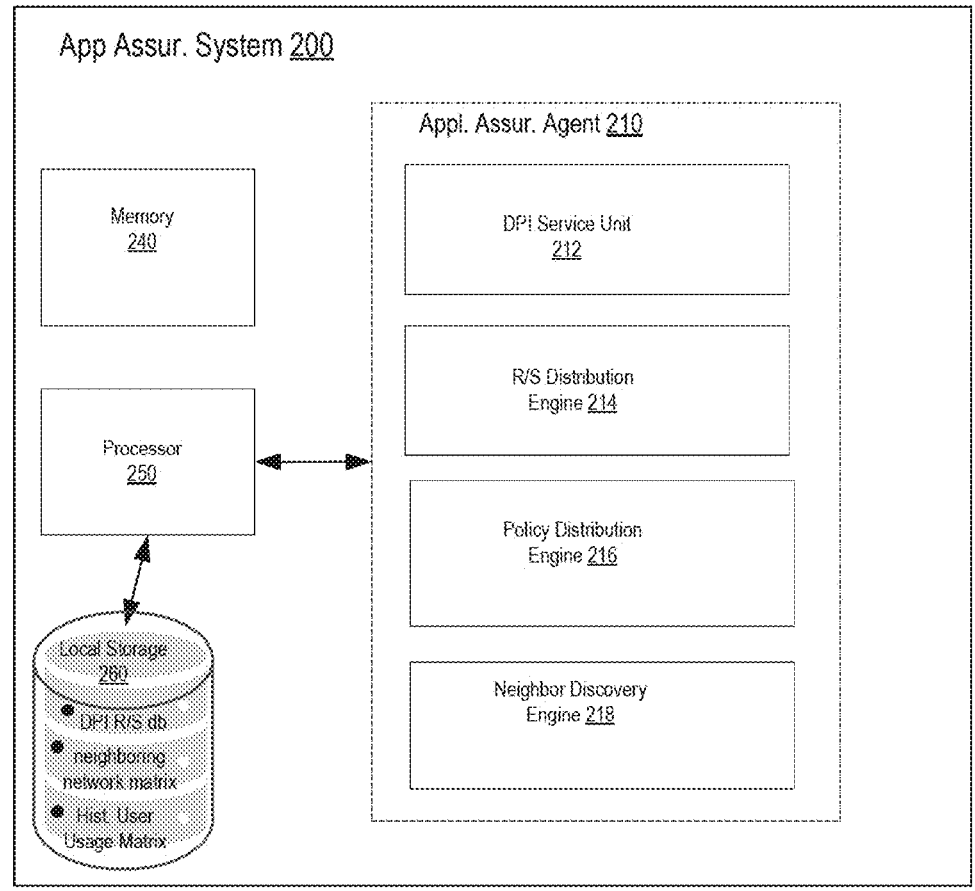
FIG. 2 shows a block diagram of the application assurance system of FIG. 1 as in some examples.

Referring to FIG. 2, a block diagram of the application assurance system of FIG. 1 as in some examples is shown. Application assurance module 200 includes at least one memory 240, at least one processor 250, a local storage unit 260, and an application assurance agent 210. The at least one processor 250 couples to the at least one memory 240. The storage unit 260 couples to the processor 250 for supplying rules, signatures, patterns, neighboring network data, and historical user data (to be described further in detail as follows). Application assurance agent 210 includes DPI service unit 212, Rules/Signatures (R/S) distribution engine 214, policy distribution engine 216, and neighbor discovery engine 218. DPI service unit 212 couples to each one of the units: R/S distribution engine 214, policy distribution engine 216, and neighbor discovery engine 218. Application assurance agent 210 couples to memory 240 and the processor 250, wherein memory 240 includes computer-readable instructions stored thereon for application assurance processing that, when executed by the at least one processor cause the at least one processor to perform the method of application assurance described herein.

For example, during operation, DPI service unit 212 couples to the at least one memory 240 having computer-readable instructions stored thereon for application assurance processing that, when executed by the at least one processor cause the at least one processor 250 to instantiate a rule-based application signature database. For example, processor 250 retrieves a first set of application names and a first set of associated application signatures, generating records within the rule-based application signature database. Further, the DPI service unit 212 in cooperation with processor 250 couple to receive a query from a first network element device (NE1) in association with an execution permission request of a first application by a user. Using the rule-based application signature database, DPI service unit 212 verifies application compliance of the requested application. In one example, verification includes parsing at least one packet of a first plurality of packets of a communication session between a user device and at least one application device to extract metadata. Once the metadata is extracted, verification includes detecting the application and the associated user based upon the metadata. DPI service unit 212 compares the extracted metadata with data stored in the rule-based application signature database to identify a match. In the case of an identified match, DPI service unit

212 confirms application compliance. Furthermore, in response to an application compliance verification within the rule-based application signature database, DPI service unit 212 retrieves an application signature.

In some examples, R/S distribution engine 214 couples to the at least one memory 240 having computer-readable instructions stored thereon for application assurance processing that, when executed by the at least one processor 250 cause the at least one processor 250 to transmit the application signature to the requesting network element (NE1), in response to the application compliance verification within the rule-based application signature database. The transmission includes sending the application name and the application signature to the NE and generating a record of the application signature to be stored in a local application signature cache of the NE. In some examples, the R/S distribution engine 214 couples to the at least one memory 240 having computer-readable instructions stored thereon for instantiating a rule-based application signature database.

In some examples, Neighbor discovery engine 216 couples to the at least one memory 240 having computer-readable instructions stored thereon for application assurance processing that, when executed by the at least one processor 250 cause the at least one processor 250 to detect one or more neighboring network element devices. For example, detection of the one or more neighboring network element devices includes parsing at least one packet of an application request sent from the NE to identify the NE. Detection also includes retrieve NE coordinates from a neighboring network matrix and determine the one or more neighboring network element devices based upon distance. Further, neighbor discovery engine 216 in cooperation with processor 250 couple to track application usage in a historical user usage matrix associated with the user. The tracking, for example, includes parsing at least one packet of a first plurality of packets of a communication session between a user device and at least one application device to extract metadata. Based upon the extracted metadata, the application and the associated user can be detected. An associated time stamp for communication session is identified. Tracking also includes generating a record for storing the application, associated user, and the associated time stamp in the historical user usage matrix, wherein the matrix is organized based upon the user. Also, neighbor discovery engine 216 detects a highly probable user path associated with one of the one or more neighboring network element devices, based upon the historical user usage matrix. Neighbor discovery engine 216 detects user traverse patterns and identifies an associated time stamp for the communication session of the user and the application device. Further, the NE coordinates are accessed and compared with the detected user traverse patterns and a current user location. The highly probable user path is determined using a predictive algorithm, the current user location, and the associated time stamp.

Moreover in some examples, Policy distribution engine 218 couples to the at least one memory 240 having computer-readable instructions stored thereon for application assurance processing that, when executed by the at least one processor 250 cause the at least one processor 250 to transmit the application signature to the one of the one or more neighboring network element devices associated with the detected highly probable user path, in response to the application compliance verification of the application. The policy distribution engine 218 retrieves the coordinates of the one or more neighboring network elements. Policy distribution engine 218 compares the retrieved coordinates with the detected highly probable user path to identify a match along the detected highly probable user path. In response to the identified match, the application signature is sent to one of the one or more neighboring network elements associated with the identified match.

Furthermore, the DPI service unit 212 couples to the at least one memory 240 having computer-readable instructions stored thereon for application assurance processing that, when executed by the at least one processor cause the at least one processor 250 to receive periodically at the cloud-based application assurance server, from the NE, a count of cache hits for each application in the local application signature cache of the NE. In addition, the processor updates an application signature cache of the at least one neighboring NE with one or more application names and one or more application signatures, based upon the count of cache hits for each application name to determine which application names and application signatures to send to at least one neighboring NE.

As an overview in some examples, a superset of application signatures with its associated metadata are stored in a cloud database, where the DPI service on the cloud server provided by application assurance module 200 will be responsible for accepting requests with extracted metadata from an edge device and matching it against signatures stored in the database. When cloud-based assurance module 200 sends the response to the network element, it is sent to the edge device as a mapping in the following format: "<metadata>:<r/s, application>". For example, edge device NE1 maintains a cache of rules/signatures, which holds a limited number of patterns. The size of cache entries can vary based on the memory available on the network element. This cache will be maintained as a lookup-hash with the following fields, where "metadata" and "rule/signature" can be used as a search key.

| Metadata Type | Metadata | Rule/Signature | Application | TTL (hh:mm) |
|---|---|---|---|---|

Further in this example, packet capture and metadata extraction are performed on the edge device. As noted, the metadata will be matched against the local cache of the edge device. If no match is found, the extracted metadata will be sent to the cloud-based application assurance module 200, which would match the metadata these patterns against a larger pool of rules/signatures. The matched signature would be sent to the edge device. Upon receipt, the edge device would update its cache with this metadata-to-application mapping.

Referring to FIG. 3, a flow diagram of a method for providing the application assurance service by the application assurance system of FIG. 2 in accordance with some examples is shown. In an action 304, the application assurance method includes instantiating a rule-based application signature database, wherein the rule-based application signature database is coupled to at least one cloud-based computer of an application assurance service. For example, application assurance module 200 having the application assurance method of the cloud-based application assurance system described herein instantiates a rule-based application signature database. In an action 306, receiving a query from a first network element device (NE) in association with an execution permission request of a first application by a user. For example, each one of the one or more network elements (NE1, NE2) can monitor network traffic continuously for detecting applications and applying associated firewall rules. In some examples, a local query is performed on a network element, prior to sending a query request to the cloud-based application assurance server 120a. Additionally, the application assurance method includes verifying application compliance of the first application using the rule-based application database in action 308. For example, in some examples cloud-based application assurance module 200 will parse a packet to retrieve associated metadata and compare it to the rule/signature database. In other examples, will couple to receive the network element query request and parse the metadata from the request. If a match is detected between the metadata and records in the rule/signature database, assurance module 200 grants the user permission to run the application. If no match is detected, the user is sent a "match not found" error message 309. In some examples, the user is provided with an option of marking unidentified signatures with an existing application. In the alternative, users are enabled to create a new custom application for the unidentified signature. In an action 310, assurance module 200 retrieves, based on an application compliance verification within the rule-based application database, an application signature associated with the metadata. Further, in response to an application compliance verification within the rule-based application database, assurance module 200 transmits the application signature to the network element using a rules/signature distribution engine in an action 312. Moreover, assurance module 200 detects one or more neighboring network element devices using a neighbor discovery engine in an action 314. For example, assurance module 200 parses at least one packet of an application request sent from the network element to identify the network element. Further, assurance module 200 retrieves NE coordinates from a neighboring network matrix and determines the one or more neighboring network element devices based upon distance.

In some examples for implementing the user usage and highly probable user path processing, assurance module 200 tracks application usage in a historical user usage matrix associated with the user in an action 316. The tracking, for example, includes parsing at least one packet of a first plurality of packets of a communication session between a user device and at least one application device to extract metadata. Based upon the extracted metadata, the application and the associated user can be detected. An associated time stamp for communication session is identified. Tracking also includes generating a record for storing the application, associated user, and the associated time stamp in the historical user usage matrix, wherein the matrix is organized based upon the user. In an action 318, assurance module 200 detects a highly probable user path associated with one of the one or more neighboring network element devices, using the neighbor discovery engine and the historical user usage matrix. Application assurance module 200 detects user traverse patterns and identifies an associated time stamp for the communication session of the user and the application device. Further, application assurance module 200 accesses the network element coordinates and compares these with the detected user traverse patterns and a current user location. Application assurance module 200 determines the highly probable user path using a predictive algorithm, the current user location, and the associated time stamp. In response to an application compliance verification within the rule-based application database, assurance module 200 transmits the application signature to the one of the one or more neighboring network element devices associated with the detected highly probable user path (in an action 320).

Figure 4A:
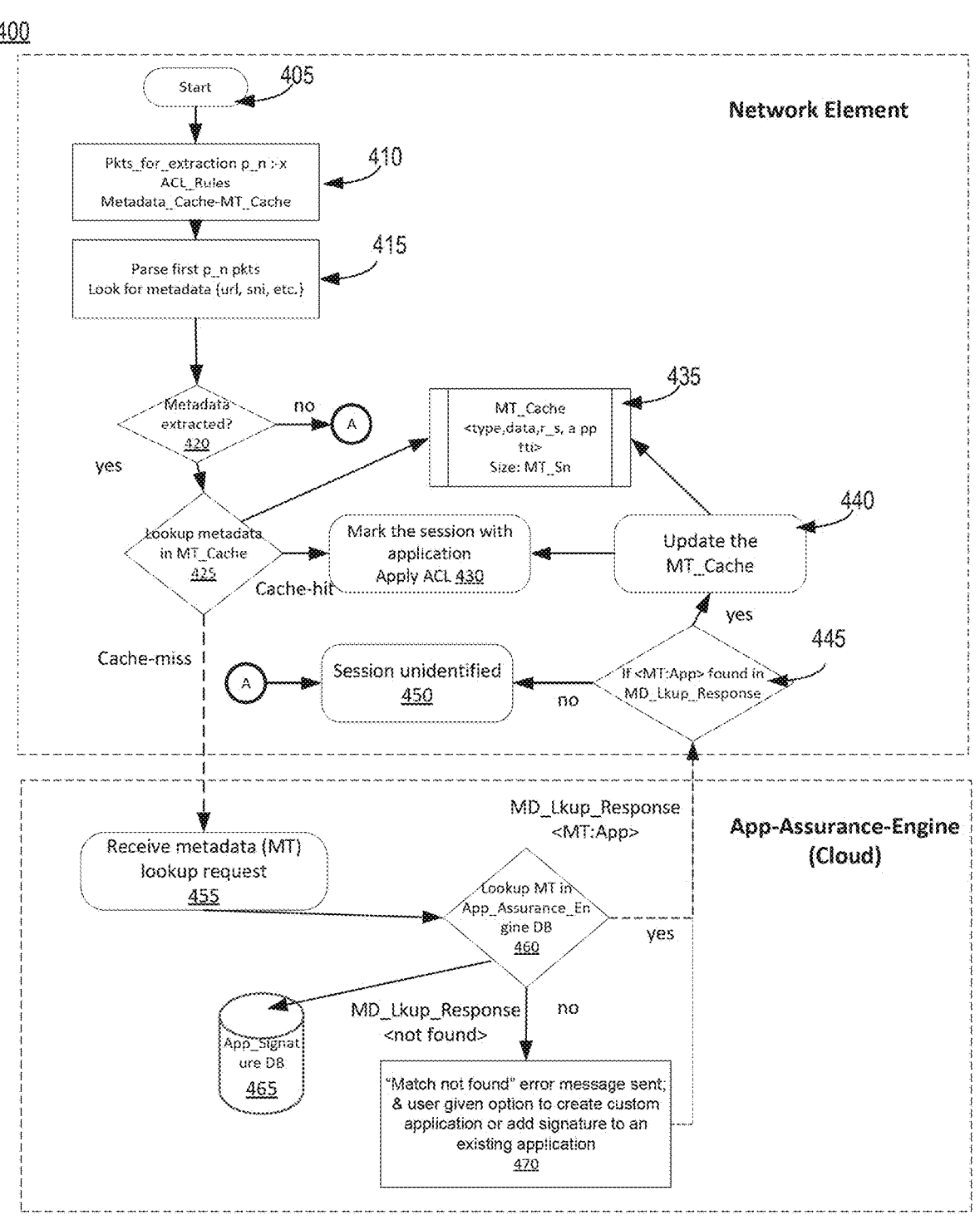
FIG. 4A illustrates a flow diagram of a method of metadata extraction in cache look up on a network element and a cloud-based application assurance engine architecture of FIG. 1 in accordance with some examples.

Referring to FIG. 4A, a flow diagram of a method of meta-data extraction in cache look-up on a network element of FIG. 1 in accordance with some examples is shown.

Starting in action 405, the network element monitors the traffic and extracts metadata from the package, in an action 410. In some examples, ACL rules are used along with metadata stored in the cache. The network element parses a first set of packets in search of metadata (in an action 415); wherein, the content of the packet is searched using various headers associated with metadata, such as url, sni, and the like. The network element detects whether metadata has been extracted, in decision step 420. If metadata has been extracted, then the network element determines, in a decision step 425, whether the metadata is found in the cache. When there is a match ("cache-hit"), the network element marks the session was an application and applies an ACL, in an action 430. When there is a no match ("cache-miss"), the network element sends a signature request to the cloud-based application assurance engine, in an action 455. In a decision action 460, the cloud-based engine searches its database 465 for the signature associated with the metadata of the signature request to determine if the signature has been previously stored for the application. When there is a match, the cloud-based engine sends the signature, application mapping, and application identification back to the network element. When there is a miss, the cloud-based engine sends the user a "match not found" error message in an action 470. Additionally, the user is given the option to create a custom application or add an associated signature to an existing application. Back on the network element side, when the signature mapping is sent back to the network element in a decision step 445, the network element determines whether the signature is found. If it is found, the network element updates its cache and marks the session with an application ACL pursuant to action 430. If the application response from the cloud base engine includes a denial, the network element will determine that the session is unidentified in an action 450.

Underlying applications for HTTP/HTTPS sessions are recognized using metadata like url, sni, server name, common name, organization name, and the like. In some examples, metadata is extracted on the network element and sent to a cloud-based service as a query request using transport protocols like WebSocket or gRPC (i.e., MD_Lkup_Request). The DPI Engine matches this metadata against its signature database and sends a response to network element in the form of "<metadata>:<r/s, application>" (i.e., MD_Lkup_Response). On receiving this response, the network element adds this mapping to its cache and also marks the session with the application identification number(s). Following the above proposition, the network element learns a set of signatures and populates its cache. When the same application is accessed in future sessions, a match can be found in the cache (cache-hit) and the network element need not send a query to the cloud-based service. This cache can also be distributed to neighboring network elements, such that when a user roams to a neighboring network element the same set of signatures can be applied. As a further feature, a policy distribution engine can track of a list of applications associated with a user-connected device as it is currently accessing the same (i.e., PDE_MD_RS_List). This data is used to push application signatures to be cached at the network element, when the user connects to the network. Distribution of signatures to neighboring network elements are performed periodically (every "m" minutes) to avoid too many cache updates on the network element for every application accessed. The policy distribution engine tracks most accessed "n" application metadata per user device and distributes this to neighbor network elements every "m" minutes. The network element sends a periodic statistic on the top applications accessed and cache-hit count to the policy distribution engine (i.e., NE_MD_Cache_Stat). The policy distribution engine will utilize this information in effective distribution of the cache to neighbor network elements.

Referring to FIG. 4B, a flow diagram of a method 480 for redistribution of signatures from the policy distribution engine of FIG. 2, in accordance with some examples is shown. In an action 486, the policy distribution engine periodically checks every t minutes whether the signature is entered into the cache 482. If the period has expired for the network element in decision step 488, the metadata is retrieved from the cache 482, in an action 490. The network element receives this metadata signature from the policy distribution engine in an action 495. The network element adds it to the top of its cache in an action 498. The network element also updates the cache-hit interval for each customer every nc minutes. This cache-hit status is sent back to the policy distribution engine, which couples to receive it in an action 484 and stores the status in cache 482.

In some examples, rules associated with user policies and signatures that are cached on one network element can be distributed to neighbor network elements based on predictive analysis. On a WLAN deployment, users connected to one Access-Point (AP), for example, are more likely to roam to a neighboring AP. Based on the neighbor discovery engine data, the contents of the cache on one network element can be applied to neighboring APs. This ensures that rules and signatures learned on one network element can be accessible for the same user on a neighboring AP, without having to re-learn the data. The policy distribution engine keeps track of signatures and policies applied per user. When a user re-connects to the network in future, these policies/signatures can be pushed to the network element; as the user is more likely to use the same set of applications, the same set of policies may be applicable. In some examples, the R/S cache of the network element reserves a certain percentage of entries for mappings learned on the same device and the remainder available for mappings pushed by the policy distribution engine on cloud.

In one example implementation, the method includes monitoring a first set of five (5) packets of a session at the network element (NE1). Since majority of the application classification operations complete within 10 packets of a flow, 5 packet in the forward direction and 5 packets in the reverse direction are enough for completing the classification. The first 5 packets of the session are tracked, where the network element (NE1) extracts the metadata and compares the metadata with other entries stored in the cache 142a in an effort to find the <metadata:application> pair. This metadata can be of type url, sni, and the like, based on the underlying protocol (http, https, and the like). If found (cache-hit), the application name is immediately applied to the session and moved to enforce the access control list rule.

In this example, a cache 142a on a network element NE1 may include the data as records from the following table:

| Meta data | Metadata | Rule/Signature | Application | TTL (hh:mm) |
|---|---|---|---|---|
| Sni | cdn.cnn.com | endswith cnn.com | Cnn | 23:39 |
| Cn | 99acres.com | contains 99acres | 99acres | 16:12 |

-continued

| Meta data | Metadata | Rule/Signature | Application | TTL (hh:mm) |
|---|---|---|---|---|
| url | lightning.cnn.com | endswith cnn.com | Cnn | 23:39 |
| Sni | static.xx.fbcdn.net | contains fbcdn endswith facebook.com | facebook | 10:19 |

The cache entries have a time stamp of 24 hours from last access on the network element NE1. Hence, efficiently utilizing memory resources. In another step, identifiable headers are extracted at the network element (NE1) and the metadata of packet is sent to the application assurance engine in the cloud. To keep track of these sessions, the identifiable five (5) tuple and session ID are stored on the network element.

| Src IP | Dst IP | Protocol | Src Port | Dst Port | Session ID |
|---|---|---|---|---|---|
| 10.17.184.58 | 199.232.253.67 | 6 | 55535 | 443 | 5443 |

On a cache-miss, the metadata of these packets are sent from the network element to the application assurance module (200) in the cloud. The network element NE1 will also maintain count for number of cache-hits for each entry in cache and send this information to Policy Distribution Engine (PDE) (216) in the cloud. This will be done periodically.

| Metadata Type | Metadata | Cache-hit-count |
|---|---|---|
| Sni | cdn.cnn.com | 10 |
| Cn | 99acres.com | 12 |
| url | lightning.cnn.com | 14 |
| Sni | static.xx.fbcdn.net | 4 |

In a fourth step, processing of the metadata at application assurance engine 200 is conducted. On receiving the metadata (e.g., "Server Name Indication" extension in the TLS protocol, URL for HTTP, and the like) from network element NE1, application-assurance agent 210 searches the local storage 260 for a pattern-match in a metadata-to-application-mapping database. If a match is found in the cloud database, this mapping {<metadata>:<r/s, application>} is sent back to the network element NE1. If there is no match, the metadata associated with the requested query can be stored within the database 260, which is accessible to the user in future sessions. Further for non-identifiable applications, the extracted metadata from sessions having no match in the application signature database in cloud, these are displayed to the user, giving the user the opportunity to mark the application. Specifically, the user can mark the metadata to be associated with one of the known applications or the user can create a new custom application signature. In another step, distribution of metadata-application mappings occurs. The policy distribution engine (216) maintains the list of metadata and number-of-cache-hits for each of these based on information periodically sent by network elements (as noted supra). The policy distribution engine 216 pushes these <metadata>:<r/s, application> mappings sorted by number-of-cache-hits to neighbor network elements. Further, a step of receiving the mapping from the cloud to network element can occur; wherein once the network element receives the <metadata>:<r/s, application> mapping, its cache is updated on the network element. The entry starts with a timestamp of 24 hours from last access, for example. Any traffic henceforth with the matching metadata will now be marked with the cached application. In another step, the access control list rule is enforced. Once the application is identified, the rule in the access control list is applied to the session, whether it be allow, deny, traffic shaping, application throttling, or redirection of traffic. An example access-rule list is as follows:

access-rule dpi_rule_list
    rule any any match app facebook deny
    rule any any match app snapchat deny
    rule any any match app instagram deny
    rule any any match app youtube ratelimit 1 Mbps rule any any
    match any any any permit For a latency and cache example, a user accesses a web-application with SNI as "cdn.cnn.com." For every http/https session, the initial 3 packets include 3-way handshake packets. The next few packets contain the required metadata, such as for example, associated certificate exchange packets which constitute the client hello packet and the server hello packet; or URI/URL for http sessions. Metadata (SNI cdn.cnn.com) extracted from these packets is searched in the local cache on the NE. NE Signature Cache-db on the NE is as below.

| Metadata Type | Data | Rule/Signature | Application | TTL (hh:mm) |
|---|---|---|---|---|
| Cn | 99acres.com | contains 99acres | 99acres | 16:12 |
| Sni | static.xx.fbcdn.net | contains fbcdn endswith facebook.com | facebook | 10:28 |

Above search results in cache-miss. The network element NE1 sends app-signature-request as below. {Metadata-Type: SNI, Metadata: cdn.cnn.com}. Application-Assurance-Engine on receiving this request will search the signature database 260 for a match and returns the following app-signature-response. {Metadata-Type:SNI, Metadata: cdn.cnn.com, R/S:endswith "cnn.com", App:cnn}. On receiving this response, network element NE1 will update its cache 142a and mark the session with application-type. After the update, cache 142a would look as below:

| Metadata Type | Data | Rule/Signature | Application | TTL (hh:mm) |
|---|---|---|---|---|
| Cn | 99acres.com | contains 99acres | 99acres | 16:12 |
| SNI | static.xx.fbcdn.net | contains fbcdn endswith facebook.com | facebook | 10:28 |
| SNI | cdn.cnn.com | endswith cnn.com | cnn | 24:00 |

The RTT latency between sending app-signature-request and receiving an app-signature-response may vary between 100 milliseconds to few seconds, depending on various parameters like network speed, messaging infra, db lookup, and the like. This latency may result into delay/failure in applying firewall rules for the first session of CNN application. When user accesses CNN or related application again resulting in session with SNI ending with cnn.com, it would result in cache-hit and there would be no delay in applying the firewall rule for the CNN session. Delay in applying firewall policies like deny, rate limit or traffic-shaping on an application would be on the first session created for this application. As the Rule/Signature database 260 recognizes the application is cached in the network element, the subsequent sessions are recognized instantly.

In this same example implementation, when the user roams to neighboring network element the signatures are sent to the same. Continuing with the above example of "cnn" application signature cached on network element NE1, each user's access to a list of applications, noting 'n' number of times is available to the network element for application assurance purposes. For example, if "cnn" has been accessed 10 times, the network element has access to this information. The network element NE1 sends statistics periodically for cache-hits to the policy distribution engine on the cloud to keep an account of this count. For this illustration, assume the following: cache size on each network element equals 100; where, the local cache reserved is 60%(60 entries reserved for locally learned metadata); and the neighbor cache reserved is 40%(40 entries for metadata mappings received from policy distribution engine). Assuming "cnn" application falls under the top 40 metadata entries based on total cache-hits, the rule/signature of "cnn" application will be pushed by policy distribution engine service to all neighbor network elements of network element NE1. Network element NE2 is the neighbor of NE1. Therefore, network element NE2 will have the following signature in its cache.

| Metadata Type | Data | Rule/Signature | Application | TTL (hh:mm) |
|---|---|---|---|---|
| SNI | cdn.cnn.com | endswith cnn.com | cnn | 24:00 |

The user/device having accessed "cnn" application in the past on network element NE1 roams to network element NE2 and continues accessing "cnn" application. For new firewall sessions created on network element NE2, SNI is extracted and a lookup is performed in the local cache. This will result in cache-hit as the cache on network element NE2 is updated by policy distribution engine 216. If the rules/signatures are not effectively distributed to neighbor network elements where probability of roaming is high, it would result in cache-miss and an overhead of app-signature-request to application assurance module 200 in the cloud. Yet, the novel application assurance system and method resolves these and other issues.

Figure 5:
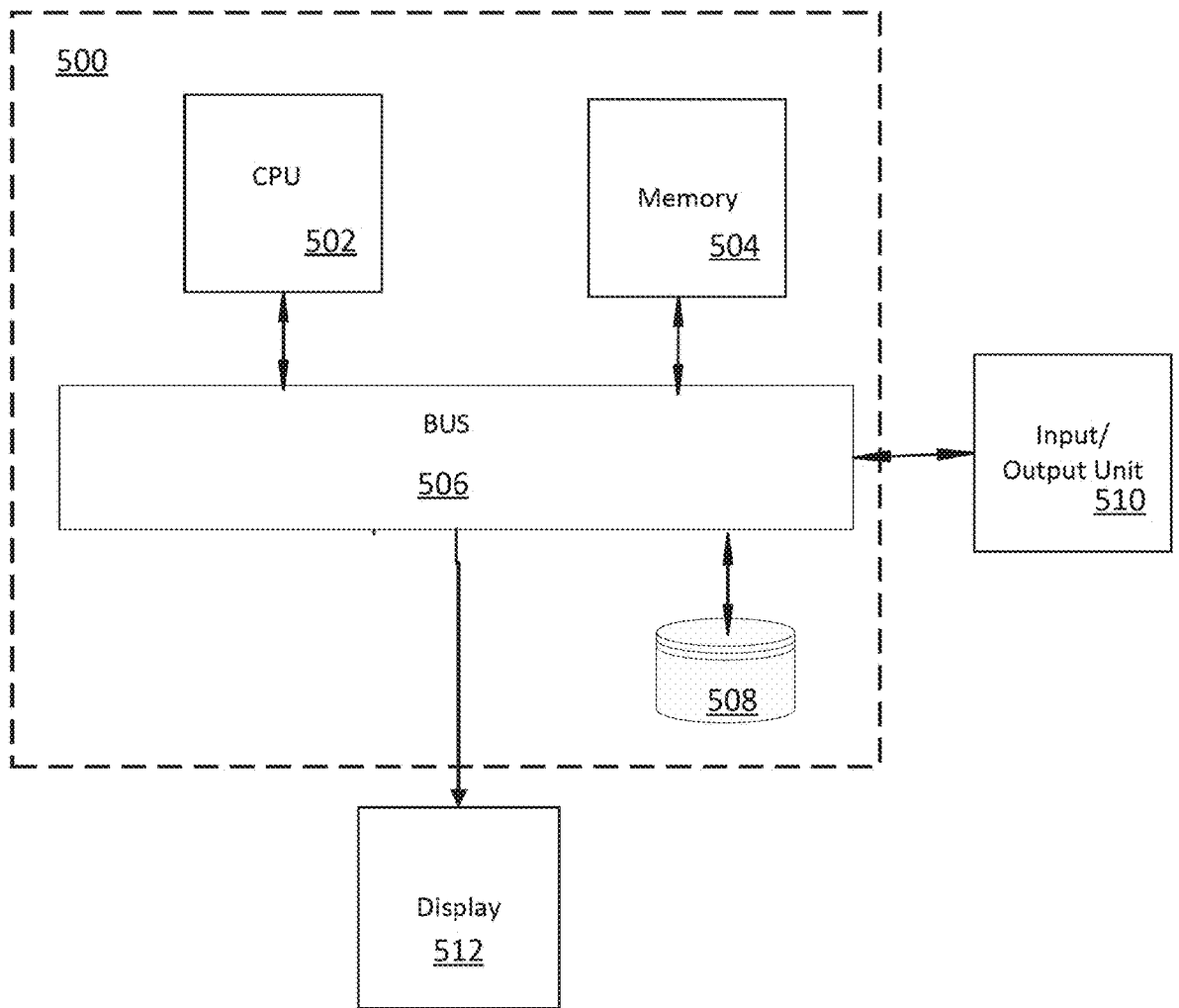
FIG. 5 presents an illustration showing an example of a computing device which may implement the examples described herein.

It should be appreciated that the methods described herein may be performed with a digital processing system, such as a general-purpose computer system. Special purpose computers, which are designed or programmed to perform one function may be used in the alternative. FIG. 5 is an illustration showing an example of the computing device which may implement the examples described herein. The computing device of FIG. 5 may be used to perform examples of the functionality for implementing an application assurance system in accordance with some examples. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some examples. The mass storage device 508 could implement a backup storage, in some examples. Memory 504 may include read only memory, random access memory, etc. Applications resident on the computing device may be stored on or accessed through a computer readable medium such as memory 504 or mass storage device 508 in some examples. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some examples.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4D. The code embodying this functionality may be stored within memory 504 or mass storage device 508 for execution by a processor such as CPU 502 in some examples. The operating system on the computing device may be iOS™, MS-WINDOWS™, OS/2™, UNIX™, LINUX™, or other known operating systems. It should be appreciated that the examples described herein may be integrated with virtualized computing system also.

In the above description, numerous details are set forth. It will be apparent, however, to one skilled in the art, that the present disclosure may be practiced without these specific details. In some instances, well-known structures and devices are shown in block diagram form, rather than in detail, in order to avoid obscuring the present invention. It is to be understood that the above description is intended to be illustrative, and not restrictive. Many other examples will be apparent to those of skill in the art upon reading and understanding the above description. Although the present disclosure has been described with reference to specific examples, it will be recognized that the present disclosure is not limited to the examples described but can be practiced with modification and alteration within the spirit and scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Some portions of the detailed descriptions have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "instantiating," "verifying," "retrieving," "transmitting," "detecting," "tracking," "generating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Reference in the description to "one example" or "an example" means that a particular feature, structure, or characteristic described in connection with the example is included in at least one example of the present disclosure. The phrase "in one example" located in various places in this description does not necessarily refer to the same example. Like reference numbers signify like elements throughout the description of the figures.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular examples only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above examples in mind, it should be understood that the examples might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the examples are useful machine operations. The examples also relate to a device or an apparatus for performing these operations. The apparatus can be specially constructed for the required purpose, or the apparatus can be a general-purpose computer selectively activated or configured by a computer program stored in the computer. Various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based example is disclosed herein, the software can be embodied in a physical machine such as a controller. For example, a controller could include a first module and a second module. A controller could be configured to perform various actions, e.g., of a method, an application, a layer or an agent.

As used herein, the term module might describe a given unit of functionality that can be performed in accordance with one or more examples of the present disclosure. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

The examples can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Examples described herein may be practiced with various computer system configurations including hand-held devices, tablets, microprocessor systems, microprocessor-based or programmable consumer electronics, minicomputers, mainframe computers and the like. The examples can also be practiced in distributed computing environments where tasks are performed by remote processing devices that are linked through a wire-based or wireless network.

In various examples, one or more portions of the methods and mechanisms described herein may form part of a cloud-computing environment. In such examples, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

What is claimed is:

1. An application assurance method, comprising:
instantiating a rule-based application signature database, wherein the rule-based application signature database is coupled to at least one cloud-based computer of an application assurance service;
receiving a query from a first network element device (NE) in association with an execution permission request of a first application by a user;
verifying application compliance of the first application using the rule-based application signature database;
retrieving, based on the application compliance verification within the rule-based application signature database, an application signature;
transmitting, in response to the application compliance verification within the rule-based application signature database, the application signature to the NE using a rules/signature distribution engine;
detecting one or more neighboring network element devices using a neighbor discovery engine;

tracking application usage in a historical user usage matrix associated with the user;
detecting a first determined user path associated with one of the one or more neighboring network element devices, using the neighbor discovery engine and the historical user usage matrix; and
transmitting, in response to the application compliance verification within the rule-based application signature database, the application signature to the one of the one or more neighboring network element devices associated with the detected first determined user path.

2. The application assurance method of claim 1, wherein the instantiating the rule-based application signature database comprises,
retrieving a first set of application names;
retrieving a first set of application signatures associated with the first set of application names, wherein the application names are each associated with an associated application signatures; and
generating a record for each application name of the first set of application names and the associated application signature to be stored in the rule-based application signature database.

3. The application assurance method of claim 1, wherein the verifying application compliance of the first application comprises,
parsing at least one packet of a first plurality of packets of a communication session between a user device and at least one application device to extract metadata;
detecting, from the extracted metadata, the application and the associated user;
comparing the extracted metadata with data stored in the rule-based application signature database to identify a match; and
detecting, in response to an identified match, application compliance.

4. The application assurance method of claim 1, wherein the transmitting the application signature to the NE comprises,
sending an application name and the application signature to the NE; and
generating a record of the application signature to be stored in a local application signature cache of the NE.

5. The application assurance method of claim 1, wherein the detecting one or more neighboring network element devices comprises,
parsing at least one packet of an application request sent from the NE to identify the NE;
retrieving NE coordinates from a neighboring network matrix; and
determining the one or more neighboring network element devices based upon distance.

6. The application assurance method of claim 1, wherein the tracking application usage comprises,
parsing at least one packet of a first plurality of packets of a communication session between a user device and at least one application device to extract metadata;
detecting, from the extracted metadata, the application and the associated user;
identifying an associated time stamp for communication session; and
generating a record for storing the application, associated user and the associated time stamp in the historical user usage matrix, wherein the matrix is organized based upon the user.

7. The application assurance method of claim 1, wherein the detecting the first determined user path comprises, detecting user traverse patterns;

identifying an associated time stamp for communication session of the user and the application device;

accessing NE coordinates;

comparing the NE coordinates with the detected user traverse patterns and a current user location; and determining, based upon the NE coordinates, the current user location, and the associated time stamp, the first determined user path using a predictive algorithm.

8. The application assurance method of claim 1, wherein the transmitting the application signature to the one of the one or more neighboring network element devices associated with the detected first determined user path comprises, retrieving coordinates of the one or more neighboring network elements;

comparing the retrieved coordinates with the detected first determined user path to identify a match along the detected first determined user path; and sending, in response to the identified match, the application signature to one of the one or more neighboring network elements associated with the identified match.

9. The application assurance method of claim 1, further comprising, receiving periodically at the cloud-based application assurance server, from the NE, a count of cache hits for each application in the local application signature cache of the NE; and updating an application signature cache of the at least one neighboring NE with one or more application names and one or more application signatures, based upon the count of cache hits for each application name to determine which application names and application signatures to send to at least one neighboring NE.

10. An application assurance system, comprising:

a cloud-based application assurance server, having at least one processor coupled to at least one memory, the cloud-based application assurance server coupled to a first network element device (NE), wherein the cloud-based application assurance server comprises, a Deep Packet Inspection (DPI) module coupled to the at least one memory having computer-readable instructions stored thereon for application assurance processing that, when executed by the at least one processor cause the at least one processor to:

instantiate a rule-based application signature database;

receive a query from the first network element device (NE) in association with an execution permission request of a first application by a user;

verify application compliance of the first application using the rule-based application signature database; and retrieve, in response to an application compliance verification within the rule-based application signature database, an application signature;

a Rule/Signature (R/S) distribution engine coupled to the DPI module, the R/S distribution engine coupled to the at least one memory having computer-readable instructions for application assurance processing stored thereon that, when executed by the at least one processor cause the at least one processor to:

transmit, in response to the application compliance verification within the rule-based application signature database, the application signature to the first NE;

a neighbor discovery engine coupled to the DPI module, the neighbor discovery engine coupled to the at least one memory having computer-readable instructions stored thereon that, when executed by the at least one processor cause the at least one processor to:

detect one or more neighboring network element devices, track application usage in a historical user usage matrix associated with the user, and detect a first determined user path associated with one of the one or more neighboring network element devices, based upon the historical user usage matrix; and a policy distribution engine coupled to the DPI module, the policy distribution engine coupled to the at least one memory having computer-readable instructions stored thereon that, when executed by the at least one processor cause the at least one processor to:

transmit, in response to the application compliance verification within the rule-based application signature database, the application signature to the one of the one or more neighboring network element devices associated with the detected first determined user path.

11. The application assurance system of claim 10, wherein the DPI module couple to instantiate the rule-based application signature database cause the at least one processor to:

retrieve a first set of application names;

retrieve a first set of application signatures associated with the first set of application names; and generate a record of each application name of the first set of application names and an associated application signature for storage in the rule-based application signature database, wherein the application signature is one of the associated application signatures from the first set of application signatures.

12. The application assurance system of claim 10, wherein the DPI module couple to verifying application compliance of the first application cause the at least one processor to:

parse at least one packet of a first plurality of packets of a communication session between a user device and at least one application device to extract metadata;

detect, from the extracted metadata, the application and the associated user;

compare the extracted metadata with data stored in the rule-based application signature database to identify a match; and confirm, in response to an identified match, application compliance.

13. The application assurance system of claim 10, wherein the R/S distribution engine couple to transmit the application signature to the NE cause the at least one processor to:

send the application name and the application signature to the NE; and generate a record of the application signature to be stored in a local application signature cache of the NE.

14. The application assurance system of claim 10, wherein the neighbor discovery engine couple to detect the one or more neighboring network element devices cause the at least one processor to:

parse at least one packet of an application request sent from the NE to identify the NE;

retrieve NE coordinates from a neighboring network matrix; and determine the one or more neighboring network element devices based upon distance.

15. The application assurance system of claim 10, wherein the neighbor discovery engine couple to track application usage cause the at least one processor to:

parse at least one packet of a first plurality of packets of a communication session between a user device and at least one application device to extract metadata;

detect, from the extracted metadata, the application and the associated user;

identify an associated time stamp for communication session; and generate a record for storing the application, associated user and the associated time stamp in the historical user usage matrix, wherein the matrix is organized based upon the user.

16. The application assurance system of claim 10, wherein the neighbor discovery engine couple to detect the first determined user path cause the at least one processor to:

detect user traverse patterns;

identify an associated time stamp for the communication session of the user and the application device;

access NE coordinates;

compare the NE coordinates with the detected user traverse patterns and a current user location; and determine, based upon the NE coordinates, the current user location, and the associated time stamp, the first determined user path using a predictive algorithm.

17. The application assurance system of claim 10, wherein the policy distribution engine couple to transmit the application signature to the one of the one or more neighboring network element devices associated with the detected first determined user path cause the at least one processor to:

retrieve the coordinates of the one or more neighboring network elements;

compare the retrieved coordinates with the detected highly probable user path to identify a match along the detected first determined user path; and send, in response to the identified match, the application signature to one of the one or more neighboring network elements associated with the identified match.

18. The application assurance system of claim 10, further cause the at least one processor to:

receive periodically at the cloud-based application assurance server, from the NE, a count of cache hits for each application in the local application signature cache of the NE; and update an application signature cache of the at least one neighboring NE with one or more application names and one or more application signatures, based upon the count of cache hits for each application name to determine which application names and application signatures to send to at least one neighboring NE.

19. A non-transitory computer-readable medium having instructions stored thereon, which when executed, cause at least one processor to perform one or more steps comprising:

instantiating a rule-based application signature database, wherein the rule-based application signature database is coupled to at least one cloud-based computer of a cloud-based application assurance service;

receiving a query from a first network element device (NE) in association with an execution permission request of a first application by a user;

verifying application compliance of the first application using the rule-based application signature database;

retrieving, based on the application compliance verification within the rule-based application signature database, an application signature;

transmitting, based on the application compliance verification within the rule-based application signature database, the application signature to the NE using a rules/signature distribution engine;

detecting one or more neighboring network element devices using a neighbor discovery engine;

tracking application usage in a historical user usage matrix associated with the user;

detecting a first determined user path associated with one of the one or more neighboring network element devices, using the neighbor discovery engine and the historical user usage matrix; and transmitting, based on the application compliance verification within the rule-based application signature database, the application signature to the one of the one or more neighboring network element devices associated with the detected first determined user path.

20. The non-transitory computer-readable medium of claim 19 having instructions stored thereon, wherein the tracking application usage comprises, tracking a count of cache hits for each application in the application signature cache; and periodically sending the count of cache hits for each application to the cloud-based application assurance service.

* * * * *